US006101701A

United States Patent [19]
Potocnik et al.

[11] Patent Number: 6,101,701
[45] Date of Patent: Aug. 15, 2000

[54] REINFORCEMENT RING FOR ROTATING BODIES AND METHOD FOR PRODUCING THE SAME

[75] Inventors: Joze Potocnik; Ivan Cerin; Boris Krzisnik, all of Idrija, Slovenia

[73] Assignee: Comtrade Handelsgesellschaft mbH, Klagenfurt, Austria

[21] Appl. No.: 09/053,902

[22] Filed: Apr. 2, 1998

Related U.S. Application Data

[62] Division of application No. 08/535,010, filed as application No. PCT/EP95/00495, Feb. 10, 1995, Pat. No. 5,736,804.

[30] Foreign Application Priority Data

Feb. 10, 1994 [WO] WIPO .................... PCT/EP94/00381

[51] Int. Cl.[7] .................................... B23P 17/00
[52] U.S. Cl. ........................ 29/417; 16/108; 310/233
[58] Field of Search .................... 29/597, 417; 16/108; 310/233

[56] References Cited

U.S. PATENT DOCUMENTS

| | | | |
|---|---|---|---|
| 1,972,789 | 9/1934 | Newkirk | 29/597 |
| 3,079,520 | 2/1963 | Schafer et al. | 29/597 |
| 3,290,527 | 12/1966 | Habermann | 29/597 |
| 4,562,369 | 12/1985 | Gerlach et al. | 310/235 |
| 4,598,463 | 7/1986 | Gerlach et al. | 29/597 |
| 4,611,391 | 9/1986 | Franz | 29/597 |
| 4,698,902 | 10/1987 | Bode | 29/597 |
| 4,868,440 | 9/1989 | Gerlach et al. | 310/236 |
| 5,124,609 | 6/1992 | Nagasaka | 310/233 |
| 5,491,373 | 2/1996 | Cooper | 310/235 |
| 5,497,042 | 3/1996 | Nettelhoff | 310/219 |
| 5,925,962 | 7/1999 | Kobman | 29/597 |

FOREIGN PATENT DOCUMENTS

| | | |
|---|---|---|
| 350855 | 11/1989 | European Pat. Off. . |
| 599911 | 6/1934 | Germany . |
| 1056256 | 4/1959 | Germany . |
| 393507 | 11/1965 | Switzerland . |
| 464334 | 12/1968 | Switzerland . |
| 1312059 | 4/1973 | United Kingdom . |

*Primary Examiner*—Irene Cuda
*Assistant Examiner*—Anthony L. Green
*Attorney, Agent, or Firm*—Klein & Szekeres, LLP

[57] ABSTRACT

A reinforcement ring (10) for rotating bodies, for example commutators, comprises at least one metal ring (12) having a rectangular cross-section and a fiberglass ring (14) having a rectangular cross-section, the metal ring and the fiberglass ring both being connected at their end faces to form a unit.

19 Claims, 4 Drawing Sheets

REINFORCEMENT RING FOR ROTATING BODIES AND METHOD FOR PRODUCING THE SAME

CROSS-REFERENCE TO RELATED APPLICATION

This application is a Division of application Ser. No. 08/535,010; filed as an International Application on Feb. 10, 1995; issuing as U.S. Pat. No. 5,736,804, which is a 371 of PCT/EP95/00495 filed Feb. 10, 1995.

BACKGROUND OF THE INVENTION

The invention concerns a reinforcement ring for rotating bodies, such as commutators, a method for its manufacture, and the application of the invented reinforcement rings in commutators.

There are various known designs of commutators which are strengthened with fiberglass reinforcement rings. Despite the great advantages of these commutators (for example, the low weight and the possibility of simple and dimensionally precise manufacture of the fiberglass rings and the commutators) since the reinforcement rings simultaneously function as electrical insulators, such commutators nevertheless have one drawback compared to commutators reinforced with steel rings. This drawback becomes manifest when these commutators are used for motors under high thermal load or when operating for a long time under high temperature influences. It is also possible for a thermal overload to occur as a result of some kind of fault. Whenever there is thermal overload, a local softening of the insulation ring or fiberglass ring can occur. This has the consequence that the commutator segments can be pushed beyond the tolerance values, thereby considerably shortening the lifetime of such commutators.

SUMMARY OF THE INVENTION

Thus, the purpose of the invention is to provide a reinforcement ring that can be subjected to a high thermal load and at the same time preserves the advantages of fiberglass reinforcement rings. This purpose is achieved, according to the invention, by a reinforcement ring for rotating bodies in which at least one metal ring that is rectangular in cross section is integrated on its front surface with a fiberglass ring which is rectangular in cross section. This ensures that no shifting of the commutator segments occurs, even at temperatures where the fiberglass ring is softened.

It is of particular advantage if the fiberglass ring has greater radial height than the metal ring, and for the overhang zone to be set off from the metal ring and abut against one or both of the radial surfaces or circumferential surfaces of the metal ring.

The solution according to the invention has the advantage that it is possible to use only half of the otherwise customary radial height of the fiberglass ring and the steel or metal ring to make the compound ring. This means that the production costs of these rings are not significantly increased, as would be the case if the two rings had to be nested in each other.

Another advantage of this compound reinforcement ring consists in that the fitting together at the end surface does not require very close tolerances in producing the respective diameters at which the two rings mate shearwise. If the fiberglass ring and the steel ring were nested together, the diameter tolerances at the joining site would have to be many times smaller than those of the invented reinforcement rings.

If the commutator is designed for maximum thermal and dynamic loading, it is especially advantageous for the corresponding reinforcement ring to have two metal rings, arranged on the respective end surfaces of the fiberglass ring. This strength can be further enhanced if the reinforcement ring is fashioned such that the fiberglass ring has both a larger outer diameter and a smaller inner diameter than the two metal rings and both overhang zones are axially offset partly in the direction of the metal rings, so that the one overhang zone abuts against the radial inner surface of the one metal ring and the other overhang zone abuts against the radial outer surface of the other metal ring, while it is advantageous to have both metal rings of identical configuration.

Another basic purpose of the invention is to specify a method of production of a reinforcement ring for rotating bodies, such as commutators, which has a high thermal load capacity and the respective advantages of metal rings and fiberglass rings, which at the same time can be produced in a very cost effective way.

The solution of this problem according to the invention involves a method of production of a reinforcement ring for rotating bodies, such as commutators, with the process steps:

a) production of at least one metal ring that is rectangular in the radial cross section, e.g., by punching out from a metal plate, cutting off from a metal pipe, or deep drawing from metal sheet;

b) production of a fiberglass ring that is rectangular in radial cross section by winding of glass fibers while feeding synthetic resin, with a larger radial height than the metal ring;

c) joining of the rings at the end surface; and d) shifting of at least one overhang region consisting of glass fibers axially in the direction of the at least one metal ring, such that the at least one shifted overhang region abuts against one radial surface of the metal ring or rings and also makes contact with the other fiberglass ring.

It is especially advantageous when the shifting of the overhang region is a stamping process, in which the at least one metal ring is part of the stamping tool. This advantage can be further enhanced when the second part of the stamping tool is a circular groove in the commutator segments, formed from material punched out, since in this way the overhang region is shifted toward the metal ring at the same time as the reinforcement ring is mounted.

The reinforcement rings according to the invention can be used with special advantage for the strengthening of the segments in a commutator. Of special advantage here are reinforcement rings, one or both of whose radial surfaces of the metal ring are partly covered with fiberglass material, and these fiberglass parts can be shifted with particular advantage by means of a stamping process. This stamping process can be carried out separately in a stamping tool or directly in the commutator itself. In the latter case, the metal ring functions as a part of the stamping tool, while the circular groove of the punched-out segments function as the second part of the tool (as depicted in FIG. 9, for example).

The reinforcement rings provided with overhanging regions open up a very simple possibility of providing the metal ring portion with a desirable pretension, if the reinforcement ring is forced with the fiberglass side in front into a circular groove present in the commutator, said circular groove being beveled in the axial direction so that the fiberglass ring is tilted either toward the axis or toward the outer surface of revolution, so that the metal ring is pretensioned either radially inward or radially outward.

The use of the reinforcement rings according to the invention means that both the steel ring and also a portion of the fiberglass ring form the bearing portion of the armoring ring, and it is possible to use the overhang region as an insulating layer between the steel ring and the copper commutator segments.

The use of the reinforcement rings according to the invention makes it possible to adapt the structural designs of the commutator reinforcement to the various quality requirements for commutators. The advantage of the structures lies in that a bearing piece of the compound ring is elastically stretched and pre-tensioned in all cases, thus conferring on the commutator the characteristics of so-called pre-tensioned commutators.

As compared to the known designs, a further advantage lies in that a portion of the space between the steel ring and the armatures of the copper segments is filled up with a casting compound, which is cast over the entire commutator. If the casting compound has high heat strength, the copper segments will be further supported against the steel ring with a high-strength material.

In order to prevent the commutator segments from shifting, at least one part of the height of the steel ring lies against the layer of casting compound. Thus, between this ring portion and the armature of the copper segments there is yet another additional insulating layer of material other than glass fibers which, if it is heat-resistant, furnishes further protection against shifting of the copper segments.

Another advantage of the reinforcement rings according to the invention is that they can be placed directly against the copper segments on both sides of the ring. This makes it possible to drive the ring directly into the grooves of the copper segments, thus wedging the ring in the segments and thereby orienting the segments in precise radial positions.

A further advantage of these reinforcement rings according to the invention also consists in that the steel ring need only have such a spacing from the armatures of the copper segments as is necessary for an electrical insulation. This maintains a thin layer of molded material between the steel ring and the armatures of the copper segments. But at the same time, the space or the circular groove is optimally utilized for the seating of the steel ring and it is possible to employ steel rings of relatively of the copper segments as is necessary for an electrical insulation. This maintains a thin layer of molded material between the steel ring and the armatures of the copper segments. But at the same time, the space or the circular groove is optimally utilized for the seating of the steel ring and it is possible to employ steel rings of relatively large radial height.

Other features and advantages of the invention will follow from the enclosed description of several embodiments, as well as the figures to which reference is made.

DETAILED DESCRIPTION OF THE INVENTION

Figure 1:
FIG. 1 is a cross section through a fiberglass ring before being fitted together with a steel ring.
Figure 2:
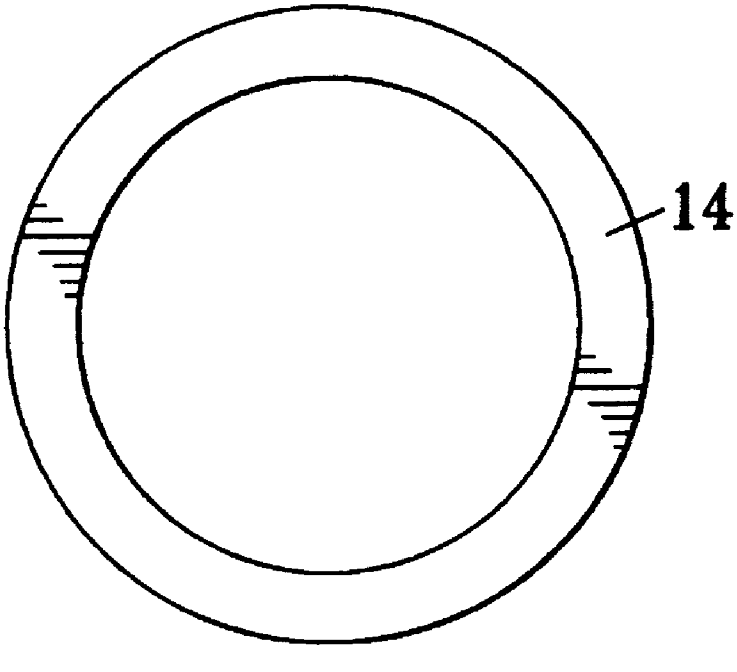
FIG. 2 is a top plan view of the fiberglass ring of FIG. 1.
Figure 3:
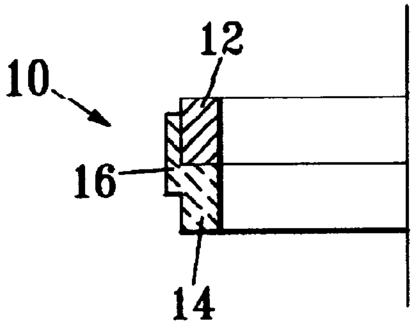
FIG. 3 is a partial cross section of a first embodiment of the invention.

FIGS. 1 and 2 show, in different views, a fiberglass ring or insulation ring 14 to the reinforcement ring 10 shown in FIG. 3 consists of metal ring 12 with rectangular cross section and the fiberglass ring 14, likewise with rectangular cross section, while the radial height of the fiberglass ring 14 is greater than the radial height of the steel ring 12. In this representative embodiment, the insulation ring 14 has the same or a smaller inner radius than the metal ring 12, and a radial overhang 16 is present, which is axially displaced in the direction of the metal ring 12 by means of a stamping process so that a portion of the outer radial surface of the steel ring 12 is covered with this overhang 16, yet this overhang 16 still makes contact with a region of the fiberglass ring 14.

Figure 4:
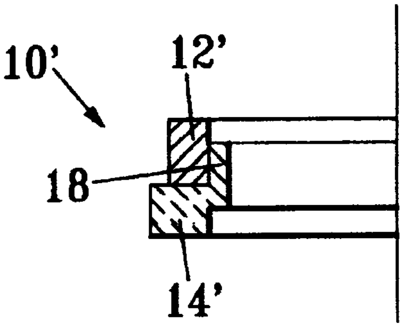
FIG. 4 is a partial cross section of a second embodiment of the invention.

The reinforcement ring 10' shown in FIG. 4 differs from the embodiment of FIG. 3 in that an overlap region 18 lies against the surface of a steel ring 12' oriented toward the axis and additionally a fiberglass ring 14' has the same or a larger outer diameter than a metal ring 12'.

Figure 5:
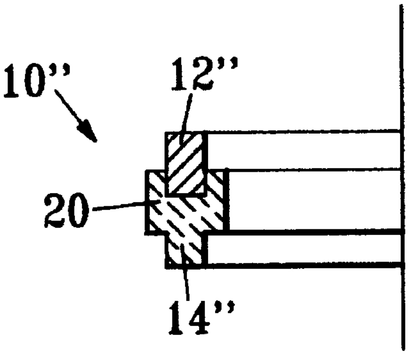
FIG. 5 is a partial cross section of a third embodiment of the invention.

In the reinforcement ring 10' shown in FIG. 5, both radial surfaces of a steel ring 12" are partly covered by overhang regions 20 of a fiberglass ring 14". Thus, the fiberglass ring 14" has a shoulder lying against the steel ring 12", which has the same radial height and is flush with the steel ring 12".

Figure 6:
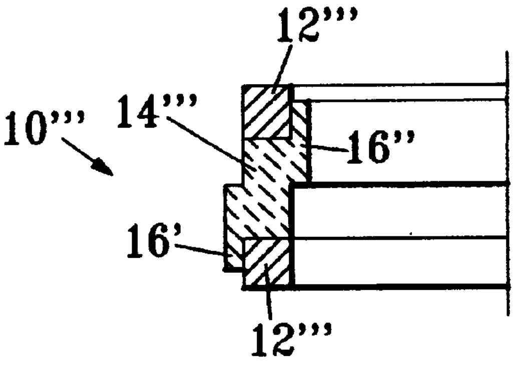
FIG. 6 is a partial cross section of a fourth embodiment of the invention.

The reinforcement ring 10'" shown in FIG. 6 has a metal or steel ring 12'" at both end surfaces of a fiberglass ring 14'". Since the fiberglass ring 14'" has both a larger outer diameter and a smaller inner diameter than the two steel rings 12'", of identical configuration in this case, there are two overhang regions 16' and 16" that are axially shifted in opposite directions so that the one overhang regions 16' lies against the outer surface of the one metal ring 12'" and the other overhang region 16" against the inner surface of the other metal ring 12'", yet both overhang regions 16' and 16" still make contact with a region of the fiberglass ring 14'".

Figure 7:
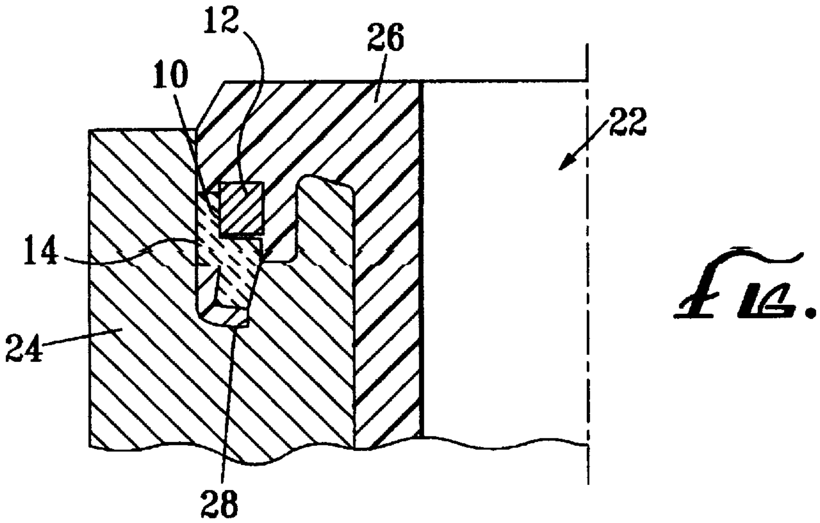
FIG. 7 is a partial cross section through a commutator with a reinforcement ring according to the first embodiment.

FIG. 7 shows the use of the reinforcement ring 10 per FIG. 3 in a commutator 22, which is provided on its outer surface with segments 24 that are embedded in molding compound 26. Furthermore, the commutator 22 has a circular groove 28, which is essentially formed by cutouts from the segments 24 and their circular arrangement. This circular groove 28 is situated concentrically with the outer circumference of the commutator 22.

As already mentioned, the characteristic of the reinforcement ring 10 lies in the fact that both rings 12, 14 make contact at the end surface, and that the supporting part of the fiberglass ring 14 is extended toward the steel ring 12, while the outer layer of the fiberglass ring 14 is shear-displaced and clutches the outer cylindrical surface of the steel ring 12, thereby joining the two rings 12, 14. The reinforcement ring 10 formed in this way thus comprises three parts, one of which is the steel ring 12, the second the supporting portion of the fiberglass ring 14, and the third the overhang region 16, which functions as an insulation lining of the steel ring 12 and at the same time joins the steel ring 12 to the fiberglass ring 14.

The commutator reinforcement in this representative embodiment is configured such that the supporting portion of the fiberglass ring 14 is elastically deformed on the armatures of the segments 24, consisting of copper, for example. The force resulting from the elastic elongation of this part produces a force component on the segments 24 in the direction of the axis of the commutator 22. Accordingly, the segments 24 press against the insulating shell of the steel ring 12, formed by the overhang region 16, which is thereby compressed and firmly constrained. Thus, the steel ring 12 is under compressive load, whereas the supporting part of the fiberglass ring 14 is elongated and under tensile load.

Figure 8:
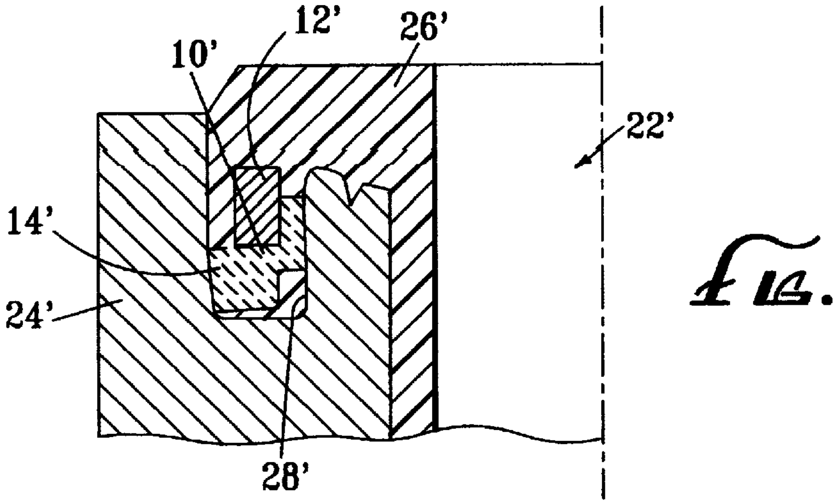
FIG. 8 is a partial cross section through a commutator with a reinforcement ring according to the second embodiment.

In the second representative embodiment of the reinforcement ring 10', shown in FIG. 8, the same parts as in the representative embodiment of FIG. 7 are given the same reference numbers, but provided with a prime symbol for ease of distinguishing.

In this representative embodiment, the reinforcement ring 10' has a steel ring 12' with rectangular cross section, the axial height being larger than its radial height. Another characteristic lies in that the two rings make contact at the end surface, and the supporting portion of the fiberglass ring 14' is extended in the steel ring 12', while the inner layer of the fiberglass ring 14' is shear-displaced and embraces a portion of the axial height of the inner shell of the steel ring 14'.

The commutator reinforcement according to this representative embodiment is configured such that the original supporting portion of the fiberglass ring 14' is pressed inwardly in the radial direction against the segments 24' of the commutator 22' by its outer circumference across the cone in the circular groove 28'. But the steel ring 12' is stretched radially outwardly by means of deformation of the armatures of the segments 24' and thus firmly restrained from displacement in a pretensioned condition.

The axial height of the steel ring 12' is greater than the height of the insulating layer formed by the overhang region 18, so that the space between the inner cylindrical portion of the steel ring 12' and the armatures of the segments 24' is filled with a heat-resistant casting compound, thereby additionally preventing the segments 24' of the commutator 22' from becoming loosened at high temperatures.

Figure 9:
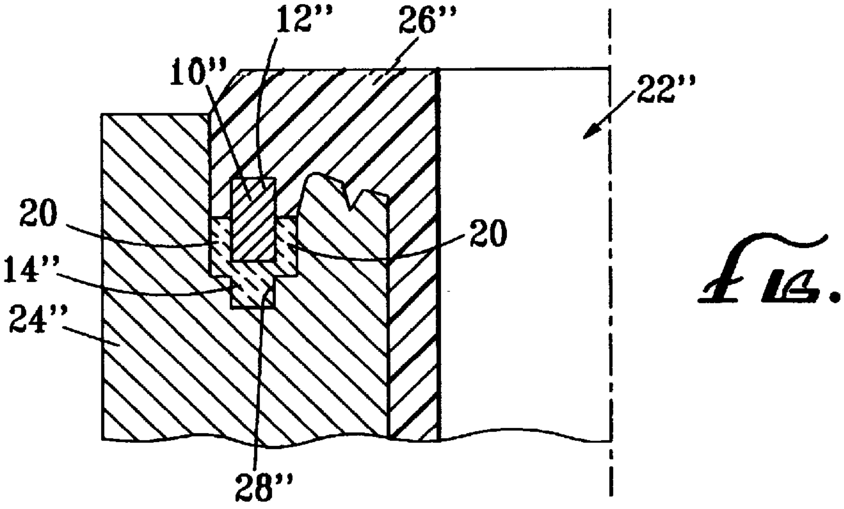
FIG. 9 is a partial cross section through a commutator with a reinforcement ring according to the third embodiment.

In the representative embodiment shown in FIG. 9 for the reinforcement ring in a commutator 22', again the same reference numbers are used, but provided with ". The reinforcement ring 10" constructed for this sample application consists of a steel ring 12" of rectangular cross section, whose axial ring height is larger than the radial height of the steel ring 12".

Once again, the special feature here is that the two rings 12" and 14" make contact at the end surface, and the supporting portion of the fiberglass ring 14" is extended in the steel ring 12", whereby the inner and outer layer or overhang regions of the fiberglass ring 14" are shear-displaced in the direction of the steel ring 12" and embrace a portion of the axial height of the inner and outer cylindrical surface of the steel ring 12".

The commutator reinforcement according to this representative application is designed so that the reinforcement ring 10" formed and put together in this manner is driven into cutouts of the segments 24" fashioned in a circular groove 28" and additionally secured by means of the deformation of the armatures of the segments 24" in the outward direction.

All three of the above-described sample applications are intended for the commutator configurations in which the space between the segments 24, 24' and 24" is filled with casting compound or molding compound 26, 26' and 26", i.e., configurations having no insulating bars between the segments 24, 24' and 24".

The commonality and the advantage of the usage of the reinforcement rings according to these embodiments lies in the fact that the reinforcement rings join the commutator segments to each other at precisely defined spacing and at precisely defined diameter even before the casting with the molding compound.

Another advantage following from this type of connection of the commutator segments lies in the fact that no additional implements need to be used during the casting process of the commutators to hold the commutator segments together until the casting is completed.

Figure 10:
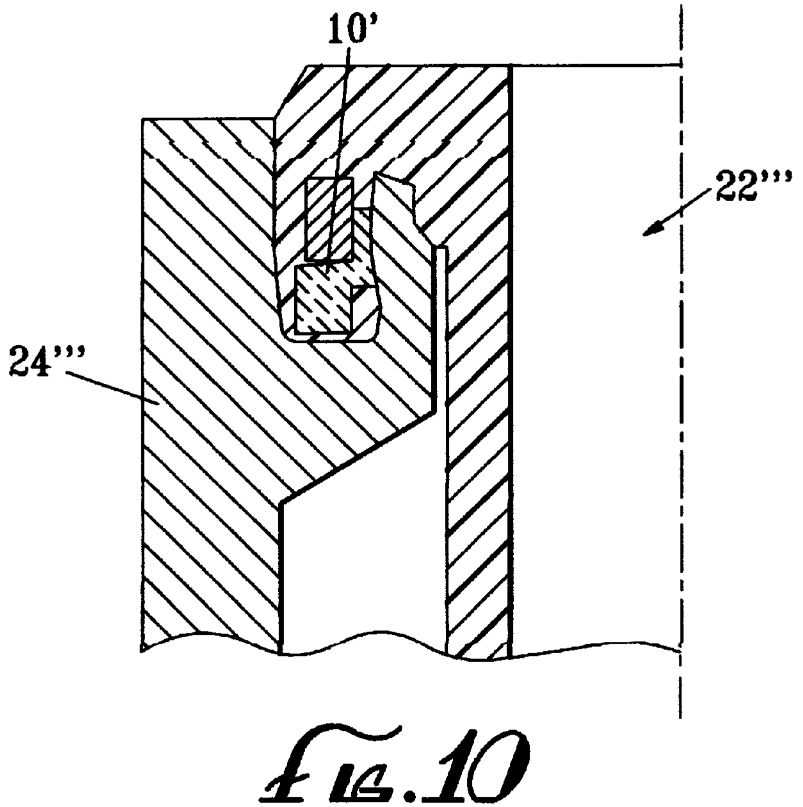
FIG. 10 is a partial cross section through a commutator with a reinforcement ring according to the second embodiment, but with a fourth type of embodiment.

FIG. 10 shows a sample application in which the segments 24'" of a commutator 22'" are alternatively fashioned with intervening insulation bars. Once again, the same reference numbers are used here, but now provided with'".

The reinforcement ring used for this sample application corresponds to the reinforcement ring 10' shown in FIG. 4. This reinforcement ring 10' consists of the steel ring 12' of rectangular cross section, whose axial ring height is greater than the radial thickness of the ring.

The special feature of this sample application lies in that the two rings make contact at the end surface, and that the supporting part of the fiberglass ring 14' is extended in the steel ring 12', while the inner layer of the fiberglass ring 14' is shear-displaced and embraces a portion of the axial height of the inner cylindrical surface of the steel ring 12'.

This commutator reinforcement is intended for commutators which are composed of copper segments and intervening insulation bars. In this type of reinforcement, all three parts of the compound reinforcement ring 10' are stretched outwardly in the radial direction by means of deformation of the armature elements of the segments 24'". In this case, the insulation bars between the armatures of the segments 24'" are extended and serve to prevent the reinforcement ring 10' from returning to the starting position, both the steel ring 12' and the fiberglass ring 14' being radially outwardly pre-tensioned.

Figure 11:
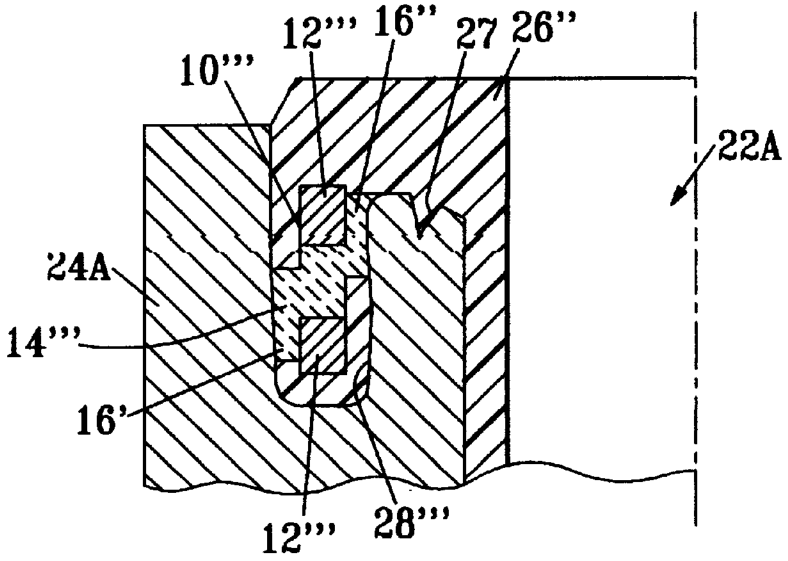
FIG. 11 is a partial cross section through a commutator with a reinforcement ring according to a third embodiment with two metal rings.

In the sample application shown in FIG. 11 for the reinforcement ring 10'" in a commutator 22*a*, again the same reference numbers are used, but now furnished with'".

The reinforcement ring 10'" constructed for this sample application consists of two steel rings 12'" of rectangular cross section and a fiberglass ring 14'" arranged in between. Here, the special feature lies in that the three rings 12'" and 14'" make contact at the end surface and that the supporting part of the fiberglass ring 14'" is extended at the two steel rings 12'", the inner and outer layer or overhang regions 16' and 16" of the fiberglass ring 14'" being shear-displaced oppositely in the direction of the two steel rings 12'", and embracing a portion of the axial height of the inner cylindrical surface of the one steel ring 12'" and the outer cylindrical surface of the other steel ring 12'", respectively.

The commutator reinforcement according to this sample application is designed so that the reinforcement ring 10'"

formed and constructed in this way is driven into cutouts of the segments 24*a* formed in a circular groove 28''' and additionally braced by means of the deformation of the armatures of the segment 24*a* in the outward direction. This deformation can be created either by mortising a notchlike groove 27 or by bending.

The above-described sample application is also intended for the commutator designs in which the space between the segments 24*a* is filled with casting compound or molding compound, i.e., designs having no insulating bars between the segments 24*a*.

What is claimed is:

1. A method for production of a reinforcement ring for a commutator, comprising the steps of:

a) providing a metal ring that is rectangular in cross section and that has an end surface and a radial surface;

b) providing a fiberglass ring that is rectangular in cross section with an end surface, the fiberglass ring having a larger radial height than the metal ring;

c) joining the metal and fiberglass rings at their respective end surfaces; and d) shifting a portion of the fiberglass ring axially in the direction of the metal ring so as to create a displaced overhang region that abuts on the radial surface of the metal ring.

2. The method of claim 1, characterized in that the shifting step includes a stamping procedure in which the metal ring is part of a stamping die.

3. The method of claim 2, characterized in that the stamping die includes a circular groove formed in a commutator.

4. The method of claim 1, wherein the step of providing a metal ring includes the step of providing first and second metal rings, each having an end surface and a radial surface; wherein the step of providing a fiberglass ring includes the step of providing a fiberglass ring that has first and second opposed end surfaces and an inner diameter that is smaller than the inner diameter of the metal rings; wherein the joining step includes the step of joining the end surfaces of the first and second metal rings respectively to the first and second opposed end surfaces of the fiberglass ring; and wherein the shifting step includes the step of shifting a first portion of the fiberglass ring axially in the direction of the first metal ring and a second portion of the fiberglass ring axially in the direction of the second metal ring so as to create a first displaced overhang region that abuts on the radial surface of the first metal ring and a second displaced overhang region that abuts on the radial surface of the second metal ring.

5. The method of claim 1, wherein the step of providing the metal ring includes the step of punching the ring out of a metal plate.

6. The method of claim 1, wherein the step of providing the metal ring includes the step of cutting the ring from a metal pipe.

7. The method of claim 1, wherein the step of providing the fiberglass ring includes the step of forming the fiberglass ring by winding glass fibers while feeding synthetic resin.

8. The method of claim 2, wherein the step of providing a metal ring includes the step of providing first and second metal rings, each having an end surface and a radial surface; wherein the step of providing a fiberglass ring includes the step of providing a fiberglass ring that has first and second opposed end surfaces and an inner diameter that is smaller than the inner diameter of the metal rings; wherein the joining step includes the step of joining the end surfaces of the first and second metal rings respectively to the first and second opposed end surfaces of the fiberglass ring; and wherein the shifting step includes the step of shifting a first portion of the fiberglass ring axially in the direction of the first metal ring and a second portion of the fiberglass ring axially in the direction of the second metal ring so as to create a first displaced overhang region that abuts on the radial surface of the first metal ring and a second displaced overhang region that abuts on the radial surface of the second metal ring.

9. The method of claim 3, wherein the step of providing a metal ring includes the step of providing first and second metal rings, each having an end surface and a radial surface; wherein the step of providing a fiberglass ring includes the step of providing a fiberglass ring that has first and second opposed end surfaces and an inner diameter that is smaller than the inner diameter of the metal rings; wherein the joining step includes the step of joining the end surfaces of the first and second metal rings respectively to the first and second opposed end surfaces of the fiberglass ring; and wherein the shifting step includes the step of shifting a first portion of the fiberglass ring axially in the direction of the first metal ring and a second portion of the fiberglass ring axially in the direction of the second metal ring so as to create a first displaced overhang region that abuts on the radial surface of the first metal ring and a second displaced overhang region that abuts on the radial surface of the second metal ring.

10. The method of claim 4, wherein the first and second metal rings are joined to the fiberglass ring substantially simultaneously.

11. The method of claim 8, wherein the first and second metal rings are joined to the fiberglass ring substantially simultaneously.

12. The method of claim 9, wherein the first and second metal rings are joined to the fiberglass ring substantially simultaneously.

13. A method of manufacturing a commutator, comprising the steps of:

(a) manufacturing a reinforcement ring by the method comprising the steps of:

(a)(1) providing a metal ring that is rectangular in cross section and that has an end surface and a radial surface;

(a)(2) providing a fiberglass ring that is rectangular in cross section with an end surface, the fiberglass ring having a larger radial height than the metal ring;

(a)(3) joining the metal and fiberglass rings at their respective end surfaces; and (a)(4) shifting a portion of the fiberglass ring axially in the direction of the metal ring so as to create a displaced overhang region that abuts on the radial surface of the metal ring;

(b) inserting said reinforcement ring into a circular groove provided in a plurality of commutator segments circularly arranged around an axis in a spaced relationship; and (c) subsequently filling the remainder of the groove and the spaces between each two adjacent segments with a molding compound.

14. The method of claim 13, wherein the displaced overhang region of the fiberglass ring abuts the radial outer surface of the metal ring, and wherein the circular groove for accommodation of the reinforcement ring is beveled in the axial direction so that the fiberglass ring is tilted inward to the axis, thereby pre-tensioning the metal ring radially inward.

15. The method of claim 14, wherein the displaced overhang region of the fiberglass ring abuts the radial inner surface of the metal ring, and wherein the circular groove for accommodation of the reinforcement ring is beveled in the axial direction so that the fiberglass ring is tilted outward to a cylindrical surface of the commutator, thereby pre-tensioning the metal ring radially outward.

16. The method of claim 14, wherein the circular groove to accommodate the reinforcement ring is configured such that the fiberglass ring is held in place by frictional locking after being inserted.

17. The method of claim 14, wherein the circular groove to accommodate the reinforcement ring has a bulge on a wall adjacent to the axis of the commutator, so that both the metal ring and the fiberglass ring are radially pretensioned outward.

18. The method of claim 14, wherein a part of the reinforcement ring is tensioned-loaded by the commutator segments, and the reinforcement ring remains pre-tensioned after the commutator is cast in casting compound.

19. The method of claim 18, characterized in that the commutator segments are deformed by mortising a notchlike groove or by bending.

* * * * *